Figure 1:
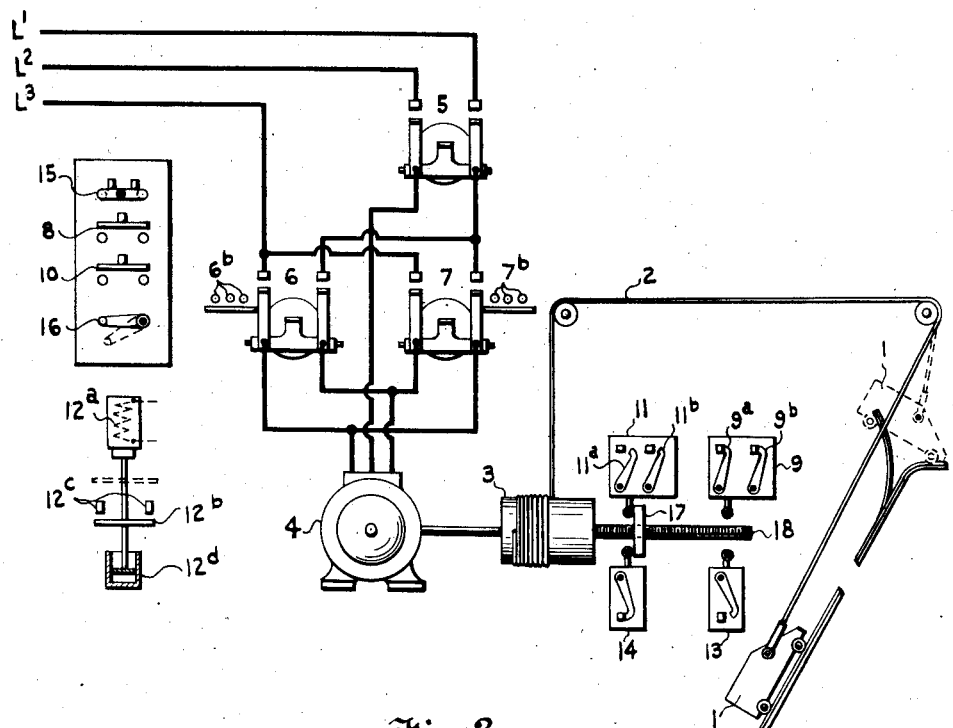

Jan. 5, 1932. C. STANSBURY 1,839,934

MOTOR CONTROLLER

Filed May 14, 1928

INVENTOR
Carroll Stansbury.
BY
ATTORNEY

Patented Jan. 5, 1932

1,839,934

UNITED STATES PATENT OFFICE

CARROLL STANSBURY, OF WAUWATOSA, WISCONSIN, ASSIGNOR, BY MESNE ASSIGN-
MENTS, TO CUTLER-HAMMER, INC., OF MILWAUKEE, WISCONSIN, A CORPORATION
OF DELAWARE

MOTOR CONTROLLER

Application filed May 14, 1928. Serial No. 277,493.

This invention relates to improvements in motor controllers.

The invention is particularly applicable to controllers for motor driven apparatus requiring operation in opposite directions between given limits.

As exemplary of apparatus to which this invention is particularly applicable automatic skip hoists may be mentioned. In apparatus of this character it is usually desirable to provide for automatic operation of the skip bucket between its loading and dumping positions and for arrest of the bucket in such positions for a period sufficient to effect loading and dumping operations.

The present invention has among its objects to provide an improved controller for motor driven apparatus of the character above mentioned.

Another object is to provide a controller for motor driven apparatus of the aforesaid character having improved automatic timing means associated therewith which is adapted to act upon stopping of the motor in either of its limits to effect restarting thereof in a reverse direction after a predetermined interval.

Another object is to provide a controller of the aforesaid character in which the timing means acts upon failure of voltage to prevent restarting of the motor except by a special operation for that purpose.

Various other objects and advantages of the invention will hereinafter appear.

The accompanying drawings illustrate a typical embodiment of the invention as applied to a skip hoist, and the same will now be described, it being understood that various changes may be made in the embodiment illustrated without departing from the spirit and scope of the appended claims.

Figure 2:
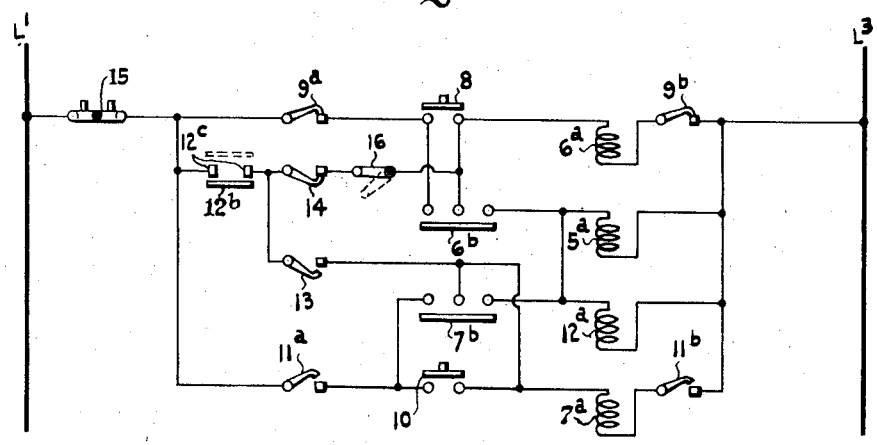

In the drawings:

Figure 1 diagrammatically illustrates the elements of the controller and also the circuit connections for the driving motor, and Fig. 2 is an across-the-line diagram illustrating the circuit connections for the control elements shown in Fig. 1.

Referring to Fig. 1, the same illustrates a skip hoist including a bucket 1 to be loaded in the position shown in full lines and dumped in the position shown in dotted lines. Bucket 1 is provided with an operating cable 2 wound upon a drum 3 and said drum is driven by a three phase alternating current motor 4 to be supplied with current from a supply circuit illustrated by lines $L^1$, $L^2$ and $L^3$. However, it is understood that other types of motors may be employed.

Motor 4 is controlled by an electromagnetic main switch 5 and a pair of electromagnetic reversing switches 6 and 7, and as is apparent from Fig. 1, main switch 5 and reversing switch 6 serve to establish power connections for operation of the motor in one direction while said main switch and reversing switch 7 serve to establish power connections for operation of the motor in a reverse direction.

Reversing switch 6 is controlled by a normally open push button 8 through the medium of a limit switch 9, while reversing switch 7 is controlled by a normally open push button 10 through the medium of a limit switch 11. Each of said reversing switches is provided with normally open auxiliary contacts indicated by reference character $b$ which serve to control the main switch 5 and to also control an electromagnetic timing relay 12. Timing relay 12, as hereinafter set forth, is adapted to control reversing switches 6 and 7 through the medium of the aforementioned limit switches 9 and 11 and additional limit switches 13 and 14. Said relay serves upon stopping of the motor in either of its limits to restart the same in a reverse direction after a predetermined interval. The control means further includes switches 15 and 16, the former serving as a stop switch and the latter being adapted to prevent automatic reversal of motor 4 upon stopping of the skip bucket in its loading position.

The limit switches 9, 11, 13 and 14 hereinbefore mentioned are all controlled by the skip hoist operating mechanism. Operation of said switches may be effected in any well known manner, as by means of a nut 17 carried by a screw 18 driven from drum 3. Limit switches 9 and 11 are both of the double pole type and are biased to closed position, and the former is adapted to open upon movement of the skip bucket into dumping position while the latter is adapted to open upon movement of the skip bucket into loading position. Limit switches 13 and 14 are both biased to open position and the former is arranged to close upon movement of the skip bucket into dumping position, while the latter is arranged to close upon movement of the skip bucket into its loading position.

Timing relay 12 is provided with an operating winding $12^a$ and a contact member $12^b$ biased towards the position shown in full lines in Fig. 1 and movable upwardly under the action of said winding to the position indicated by dotted lines. Contact member $12^b$ bridges a pair of stationary contacts $12^c$ when the same is in an intermediate position, and return thereof to the position shown in full lines in Fig. 1 is retarded by dash pot $12^d$.

The function and operation of the aforedescribed controller together with the circuit connections therefor will now be more fully described in connection with Fig. 2. Assuming that the skip bucket 1 is in its loading position, depression of push button 8 establishes an energizing circuit for reversing switch 6 extending from line $L^1$ through stop switch 15 through pole $9^a$ of limit switch 9 through push button 8 and thence through the operating winding $6^a$ of said reversing switch and pole $9^b$ of limit switch 9 to Line $L^3$. Upon response of reversing switch 6 the auxiliary contacts thereof establish an energizing circuit for main switch 5 and timing relay 12 extending from line $L^1$ through stop switch 15 through pole $9^a$ of limit switch 9 to and through auxiliary contacts $6^b$ and thence through the operating windings $5^a$ and $12^a$ in parallel to line $L^3$. Closure of main switch 5 and reversing switch 6 establishes power connections for operation of the motor in a direction to raise the loaded bucket, and during such operation of the motor relay 12 is held in its raised position. Upon movement of the skip hoist bucket into dumping position limit switch 9 is opened and interrupts the aforedescribed energizing circuits for main switch 5, reversing switch 6 and timing relay 12. The motor is thus stopped and timing relay 12 returns towards normal position against the action of its dash pot $12^d$. Upon movement of the skip bucket into dumping position, limit switch 13 closes and after a predetermined interval contact $12^b$ of the timing relay bridges stationary contacts $12^c$. An energizing circuit for reversing switch 7 is then established extending from line $L^1$ through stop switch 15, through the contacts $12^c$ and $12^b$ of the timing relay, through limit switch 13 and thence through the operating winding $7^a$ of said reversing switch and pole $11^b$ of limit switch 11 to line $L^3$. Closure of reversing switch 7 establishes an energizing circuit for main switch 5 and timing relay 12 extending from line $L^1$ through stop switch 15 through the pole $11^a$ of limit switch 11 through the auxiliary contacts $7^b$ of reversing switch 7 and through the operating windings $5^a$ and $12^a$ of said main switch and said timing relay to line $L^3$. Closure of reversing switch 7 and main switch 5 establishes power connections for operation of the motor in a direction to lower the skip bucket from its dumping position, and during such operation of the motor relay 12 is held in its raised position. Upon movement of the skip bucket into loading position, limit switch 11 is opened and interrupts the aforedescribed energizing circuits for main switch 5, reversing switch 7 and timing relay 12. The motor is thus stopped and timing relay 12 again returns towards normal position against the action of its dash pot $12^d$. Upon movement of the skip bucket into loading position limit switch 14 closes and after a predetermined interval contact $12^d$ of the timing relay bridges its stationary contacts $12^c$. An energizing circuit for reversing switch 6 is then established extending from line $L^1$ through stop switch 15 through the contacts $12^b$ and $12^c$ of the timing relay through limit switch 14 through the switch 16 and through the operating winding $6^a$ of reversing switch 6 and the pole $9^b$ of limit switch 9 to line $L^3$. Thus the reversing switch 6 is again energized and in responding establishes the aforedescribed energizing circuit for main switch 5 to provide for operation of the motor in a direction to raise the skip bucket out of its loading position.

From the foregoing it is apparent that relay 12 functions upon stopping of the skip hoist in either of its limits to effect automatic reversal of the motor after a predetermined interval determined by the setting of dash pot $12^d$. It should also be noted that opening of push button 15 interrupts the aforedescribed control circuits to provide for stopping of the skip hoist at any point. Push button 10 serves to start the motor in its bucket lowering direction by providing for energization of reversing switch 7 through the medium of stop switch 15 and limit switch 11.

Under no voltage conditions the control switches for the motor drop out to stop the same and relay 12 returns to normal position. It is apparent that upon return of relay 12 to normal position the same cannot effect automatic restarting of the motor upon restoration of voltage in the supply circuit. It is thus necessary in order to start the motor after voltage failure to effect closure of one or the other of the reversing switches by its controlling push button. As hereinbefore set forth the switch 16 is located in the control circuit established by relay 12 for closure of reversing switch 6. Thus opening of switch 16 renders the relay 12 ineffective to effect automatic reversal of the motor upon movement of the skip bucket into loading position.

What I claim as new and desire to secure by Letters Patent is:

1. The combination with a driving motor to be operated in opposite directions between given limits, a pair of switches for selectively establishing reverse power connections for said motor, means for controlling said switches to effect stopping of said motor in either of said limits and an electro-responsive relay adapted to respond upon starting of said motor in either direction and adapted to return to normal position upon stopping of said motor, said relay being adapted to act upon stopping of said motor in either of said limits to control said reversing switches for restarting of said motor in a reverse direction after a given interval.

2. The combination with a driving motor to be operated in opposite directions between given limits, of reversing means therefor, control means for said reversing means including means for stopping said motor in either of said limits, and means associated with said former means for automatically restarting said motor in a reverse direction after a predetermined interval upon stopping thereof in said limits, said means including an electroresponsive relay adapted to respond upon establishment of power connections for said motor and adapted to act during return thereof to normal position to control said reversing means for restarting of said motor, and means for rendering said relay ineffective to restart said motor in one of said limits.

3. The combination with a driving motor to be operated in opposite directions between given limits, of separate electroresponsive switches for selectively establishing reverse power connections for said motor, means for controlling said reversing switches to effect stopping of said motor in said limits, and an electroresponsive relay under the control of said reversing switches adapted to respond upon closure of either of said reversing switches and to return to normal position after a given delay upon opening of either of said reversing switches, said relay being adapted during return to normal position to control said reversing switches to effect reversal of said motor after a given interval upon stopping thereof in said limits.

4. The combination with a driving motor to be operated in opposite directions between given limits, of means for selectively establishing reverse power connections for said motor, automatic means including a single relay operable after a given delay to control said first mentioned means for temporary establishment of connections for reversal of said motor at either of said limits, and means associated with said automatic means for maintaining the power connections established thereby at either of said limits and for interrupting such power connections at the other of said limits.

5. The combination with a driving motor to be operated in opposite directions between given limits, of electroresponsive switches for selectively establishing reverse power connections for said motor, means including a single relay operable after a given delay to temporarily establish an energizing circuit for one of said switches when said motor is in one of said limits and for the other of said switches when said motor is in the other of said limits, means associated with each of said reversing switches for establishing a maintaining circuit therefor upon response thereof, and means for interrupting the maintaining circuit for one of said reversing switches when said motor is in one of said limits and for the other of said reversing switches when said motor is in the other of said limits.

6. The combination with a driving motor to be operated in opposite directions between given limits, of electroresponsive switches for selectively establishing reverse power connections for said motor, means for controlling said switches to effect stopping of said motor in said limits and restarting thereof in a reverse direction, said means including a relay under the control of said switches and adapted to respond upon establishment of power connections by said switches and tending to return to normal position after a given delay upon stopping of said motor in said limits, said relay being adapted to act upon return to an intermediate position to automatically control said switches to effect reversal of said motor upon stopping thereof in either of said limits.

7. The combination with a driving motor to be operated in opposite directions between given limits, of separate electroresponsive switches for selectively establishing reverse power connections for said motor, means for controlling said reversing switches to effect stopping of said motor in said limits, and an electroresponsive relay adapted to respond upon closure of either of said reversing switches and tending to return to normal position after a given delay upon opening of either of said reversing switches, said relay being adapted to act upon return to an intermediate position to automatically control said reversing switches for reversal of said motor upon stopping thereof in either of said limits and being adapted under no voltage conditions to return to normal position to prevent automatic restarting of said motor.

8. The combination with a driving motor to be operated in opposite directions between given limits, of means for selectively establishing reverse power connections for said motor, automatic means including a single electromagnetic relay adapted to respond upon establishment of power connections for said motor and tending to return to normal position after a given delay upon interruption of such power connections, said relay being adapted upon return to an intermediate position to control said first mentioned means to temporarily establish power connections for reversal of said motor at either of said limits, and means associated with said automatic means for maintaining the power connections established thereby at either of said limits and for interrupting such power connections at the other of said limits.

In witness whereof, I have hereunto subscribed my name.

CARROLL STANSBURY.